(12) United States Patent
Barnett et al.

(10) Patent No.: US 12,016,490 B2
(45) Date of Patent: Jun. 25, 2024

(54) SMOKER WITH VARIABLE CONFIGURATION

(71) Applicant: W.C. BRADLEY CO., Columbus, GA (US)

(72) Inventors: Brian Barnett, Fortson, GA (US); Anthony Hamilton, Hamilton, GA (US); Ramin Khosravi Rahmani, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 543 days.

(21) Appl. No.: 15/660,219

(22) Filed: Jul. 26, 2017

(65) Prior Publication Data
US 2018/0028018 A1 Feb. 1, 2018

Related U.S. Application Data

(60) Provisional application No. 62/366,903, filed on Jul. 26, 2016.

(51) Int. Cl.
*A47J 37/07* (2006.01)
*A23B 4/052* (2006.01)
*A23L 5/10* (2016.01)

(52) U.S. Cl.
CPC .......... *A47J 37/0704* (2013.01); *A23B 4/052* (2013.01); *A23B 4/0526* (2013.01); *A23L 5/17* (2016.08); *A47J 37/0786* (2013.01); *A23V 2002/00* (2013.01)

(58) Field of Classification Search
CPC .......... A23B 4/044–4/056; A23L 5/17; A23V 2002/00; A47J 37/0704; A47J 37/0786; A47J 37/0754; A47J 37/07–2037/0795

USPC .......... 99/447, 444–446, 473–476, 480–481
See application file for complete search history.

(56) References Cited

U.S. PATENT DOCUMENTS

| 145,054 | A | * | 12/1873 | Deardorff | |
| 1,052,255 | A | * | 2/1913 | Hutton | A23B 4/052 99/481 |
| 1,169,168 | A | * | 1/1916 | Lane | F24C 15/16 126/339 |
| 1,934,125 | A | * | 11/1933 | Hurt | F24C 15/16 126/41 R |

(Continued)

FOREIGN PATENT DOCUMENTS

| DE | 8711984 | 10/1987 |
| DE | 202010015614 | 5/2011 |

OTHER PUBLICATIONS

Translation of DE 20 2010 015 614U1 (Year: 2010).*
ISA/US, "International Search Report and Written Opinion for PCT/US2017/043980," dated Oct. 3, 2017, W.C. Bradley Co.

*Primary Examiner* — Drew E Becker
(74) *Attorney, Agent, or Firm* — Gable Gotwals; David G. Woodral

(57) ABSTRACT

A system includes a smoker having a cooking chamber and a firebox in fluid communication with the cooking chamber. The system includes a cooking grate within the cooking chamber, a first exhaust opening in the cooking chamber proximate the firebox, and a plurality of generally horizontal baffles below the cooking grate. At least one of these is situated near the firebox to direct smoke away from the firebox before it rises above a level of the cooking grate.

15 Claims, 13 Drawing Sheets

(56) References Cited

U.S. PATENT DOCUMENTS

| | | | | |
|---|---|---|---|---|
| 2,060,004 A * | 11/1936 | Ebberts | A47J 37/067 | 99/446 |
| 2,143,999 A * | 1/1939 | Rosson | F24B 1/202 | 126/41 R |
| 2,350,948 A * | 6/1944 | Walker | F24B 1/22 | 126/25 R |
| 2,790,380 A * | 4/1957 | Shryack | A23B 4/052 | 99/476 |
| 2,832,278 A * | 4/1958 | Taranik | A23B 4/052 | 99/473 |
| 2,902,026 A * | 9/1959 | Hathorn, Jr. | A47J 37/0704 | 126/2 |
| 3,087,414 A * | 4/1963 | Gannon | F24B 1/202 | 99/393 |
| 3,098,428 A * | 7/1963 | Maxwell | F24B 1/202 | 99/446 |
| 3,130,662 A * | 4/1964 | Robinson | F24C 15/322 | 99/481 |
| 3,455,233 A * | 7/1969 | Cable | A47J 37/0704 | 99/446 |
| 3,477,360 A * | 11/1969 | Raney | F24B 1/202 | 126/25 R |
| 3,568,590 A * | 3/1971 | Grice | A47J 37/0704 | 99/450 |
| 3,991,666 A * | 11/1976 | Tidwell | A47J 37/0763 | 99/446 |
| 4,076,008 A * | 2/1978 | Deaton | A47J 37/00 | 126/25 R |
| 4,089,258 A * | 5/1978 | Berger | A47J 37/0688 | 126/39 J |
| 4,474,165 A * | 10/1984 | Richardson | F24B 1/20 | 126/8 |
| 4,662,349 A * | 5/1987 | McKenzie | A47J 37/0682 | 126/41 R |
| 4,683,867 A * | 8/1987 | Beatty | A47J 37/0713 | 126/41 R |
| 4,700,618 A * | 10/1987 | Cox, Jr. | A23B 4/052 | 99/481 |
| 4,750,469 A * | 6/1988 | Biggs | A47J 37/067 | 126/25 C |
| 4,757,756 A * | 7/1988 | Van Marr | A47J 37/0704 | 99/476 |
| 4,791,909 A * | 12/1988 | Kalthoff | A23B 4/052 | 99/474 |
| 5,167,183 A * | 12/1992 | Schlosser | A47J 37/0713 | 126/25 R |
| 5,277,106 A * | 1/1994 | Raymer | A47J 37/0786 | 126/41 R |
| 5,473,980 A * | 12/1995 | Carpenter | A47J 37/0786 | 126/41 R |
| 5,551,332 A * | 9/1996 | Beatty | A47J 37/0704 | 126/41 R |
| 5,713,267 A * | 2/1998 | Wilson | A47J 37/0629 | 99/482 |
| 5,890,422 A * | 4/1999 | Clark | A47J 37/0786 | 99/446 |
| 5,891,498 A * | 4/1999 | Boehler | A23B 4/052 | 426/314 |
| 5,911,812 A * | 6/1999 | Stanek | A47J 37/0704 | 126/25 R |
| 6,038,964 A * | 3/2000 | Sikes | A47J 37/07 | 126/25 R |
| 6,187,359 B1 * | 2/2001 | Zuccarini | A47J 37/0786 | 126/41 R |
| 6,209,533 B1 | 4/2001 | Ganard | | |
| 6,595,197 B1 * | 7/2003 | Ganard | A47J 37/0704 | 126/1 D |
| 6,945,160 B2 * | 9/2005 | Christensen | A47J 37/067 | 126/25 R |
| 7,066,169 B2 * | 6/2006 | Feldewerth | A47J 37/0713 | 126/41 R |
| 7,241,466 B2 * | 7/2007 | Dellinger | A47J 37/0713 | 126/153 |
| 7,624,675 B2 | 12/2009 | Galdamez | | |
| 11,253,103 B2 * | 2/2022 | Stitt | A47J 37/0763 | |
| 2005/0155498 A1 * | 7/2005 | Killion | A47J 37/0704 | 99/482 |
| 2005/0217659 A1 * | 10/2005 | McClenahan | F24B 1/202 | 126/25 R |
| 2007/0221202 A1 | 9/2007 | Bruno et al. | | |
| 2008/0047441 A1 * | 2/2008 | Donoho | F24C 15/14 | 99/446 |
| 2008/0098906 A1 * | 5/2008 | Davis | A23B 4/044 | 99/482 |
| 2010/0009053 A1 * | 1/2010 | Marr | A23B 4/044 | 426/523 |
| 2012/0024171 A1 * | 2/2012 | Estes | A23B 4/052 | 99/482 |
| 2013/0035032 A1 * | 2/2013 | Schneider | H05K 7/20181 | 454/278 |
| 2017/0130966 A1 * | 5/2017 | Barajas | A47J 37/07 | |
| 2022/0110480 A1 * | 4/2022 | Cardinali | A47J 37/0786 | |
| 2023/0048016 A1 * | 2/2023 | Takahashi | A23B 4/0523 | |
| 2023/0276816 A1 * | 9/2023 | Kellner | A23B 4/052 | 426/314 |

* cited by examiner

SMOKER WITH VARIABLE CONFIGURATION

CROSS-REFERENCE TO RELATED CASES

This application claims the benefit of U.S. provisional patent application Ser. No. 62/366,903, filed on Jul. 26, 2016, and incorporates such provisional application by reference into this disclosure as if fully set out at this point.

FIELD OF THE INVENTION

This disclosure relates to cooking in general and, more specifically, to methods and systems for smoking foods.

BACKGROUND OF THE INVENTION

For the slow cooking of food, a number of different configurations of the product are known. Among them is a device known as an offset smoker. In this type of product there is a large horizontal cylindrical cooking chamber with a cooking rack means placed approximately at the midpoint of the cooking chamber, extending from one end to the other, and an exhaust means at one end. Attached to the other end of the cylinder from the exhaust means is another horizontal cylinder of similar or smaller diameter and significantly less length. This cylinder is normally offset down and an opening is provided in the upper part of the offset cylinder wall adjacent to the cooking chamber wall corresponding to a matching opening in the lower part of the cooking chamber wall adjacent to the offset cylinder. This offset cylinder is used as the location for the production of hot gas and smoke from a solid fuel fire. A general configuration of such products can be found in U.S. Pat. No. 6,209,533 to Ganard or in US Patent Publication No. 2008/0098906 by Davis, both incorporated herein by reference. The solid fuel may be wood or charcoal or a combination of both.

Flue gases from the offset cylindrical chamber, which functions as a firebox, pass into the cooking chamber, expand and cool, transfer heat and smoke flavor to the food being cooked and exit through an exhaust means at the opposite end of the cooking chamber from the firebox.

Although such current products have widespread use, and acceptance stretching over several decades of use, it is known that the distribution of heat in the cooking chamber is not altogether even as the exhaust gases exiting the firebox are hotter as they immediately enter the cooking chamber and then cool off as they travel across the cooking chamber. In addition, buoyancy forces acting on the hot gas exiting the firebox tend to elevate the hotter gases to the upper segment of the horizontal cylindrical cooking chamber as they travel across it toward the exhaust means, thus bypassing the food placed on the cooking rack. Further, that portion of the cooking area adjacent to the firebox is exposed to direct radiation from the fire through the opening between the firebox and cooking chamber while the rest of the cooking chamber has little effect from this direct fire radiation.

What is needed is a system and method for addressing the above, and related, issues.

SUMMARY OF THE INVENTION

The invention of the present disclosure, in one aspect thereof comprises a system including a smoker having a cooking chamber and a firebox in fluid communication with the cooking chamber. The system includes a cooking grate within the cooking chamber, a first exhaust opening in the cooking chamber proximate the firebox, and a plurality of generally horizontal baffles below the cooking grate. At least one of these is situated near the firebox to direct smoke away from the firebox before it rises above a level of the cooking grate.

The plurality of generally horizontal baffles may comprise baffles that are selectively removable from the cooking chamber to alter a degree of travel of smoke below the cooking grate before it is allowed to rise above the cooking grate. The plurality of generally horizontal baffles may affix to the cooking grate from below. At least one of the plurality of generally horizontal baffles may define a drainage opening.

At least one of the plurality of generally horizontal baffles may define a plurality of louvres. The plurality of louvres may be angled toward a side of the baffle to draw flowing smoke therethrough.

In some embodiments, each of the plurality of baffles is square in outline from above. At least one of the plurality of baffle may be dished with a sloped floor leading downward to a drainage opening oriented to a side of the baffle.

At least one of the plurality of baffles may comprise a frontward portion, a rearward portion, a rightward portion, and a leftward portion. Such baffle may further comprise a planar surface suspended below the cooking grate by at least one wall suspended from any of the frontward portion, rearward portion, rightward portion, and leftward portion.

In some embodiments, the system further comprises a second exhaust opening in the cooking chamber distal from the from the firebox. The first and second exhaust openings may be selectively enabled to direct exhaust smoke through the cooking chamber in combination with the plurality of generally horizontal baffles.

The invention of the present disclosure, in another aspect thereof, comprises a system having a cylindrical cooking chamber having a cooking grate therein, a firebox in fluid communication with the cooking chamber on a first end thereof, a first exhaust opening defined proximate the first end of the cooking chamber proximate the firebox, and a plurality of selectively installable baffles that direct smoke below the cooking grate away from the firebox. One or more of the baffles may be fixed inside the cooking chamber below the cooking grate to alter a path of smoke from the firebox, around the installed baffle or baffles and back toward the first exhaust opening.

In some embodiments, at least one of the plurality of baffles is a dished rectangle providing a drainage opening below the cooking grate. At least one of the plurality of baffles may comprise a dish shape where a portion of the baffle is spaced apart from the cooking grate. At least one of the plurality of baffles may slope toward a drainage opening oriented distally from the firebox. Additionally, at least one of the plurality of baffles may provide a plurality of louvres oriented to draw smoke from the firebox toward the cooking grate.

Some embodiments comprise a second exhaust opening in the cooking chamber on a second end thereof, distal from the firebox. The system may include a first exhaust control on the first exhaust opening and a second exhaust control on the second exhaust opening.

The invention of the present disclosure, in one aspect thereof, comprises a method including providing a cooking chamber having a first end and a second end and containing a cooking surface and providing a firebox producing smoke for the cooking chamber, the firebox being in fluid communication with the cooking chamber proximate the first end thereof. The method includes providing an exhaust opening proximate the first end and superior to the firebox, and affixing one of more of a plurality of baffles below the cooking surface to direct smoke below the cooking surface toward the second end of the cooking chamber and then back above the cooking surface toward the exhaust opening.

The method may further comprise altering a smoke path inside the cooking chamber by relocating one of more of the plurality of baffles inside the cooking chamber.

DETAILED DESCRIPTION OF THE PREFERRED EMBODIMENTS

Figure 1:
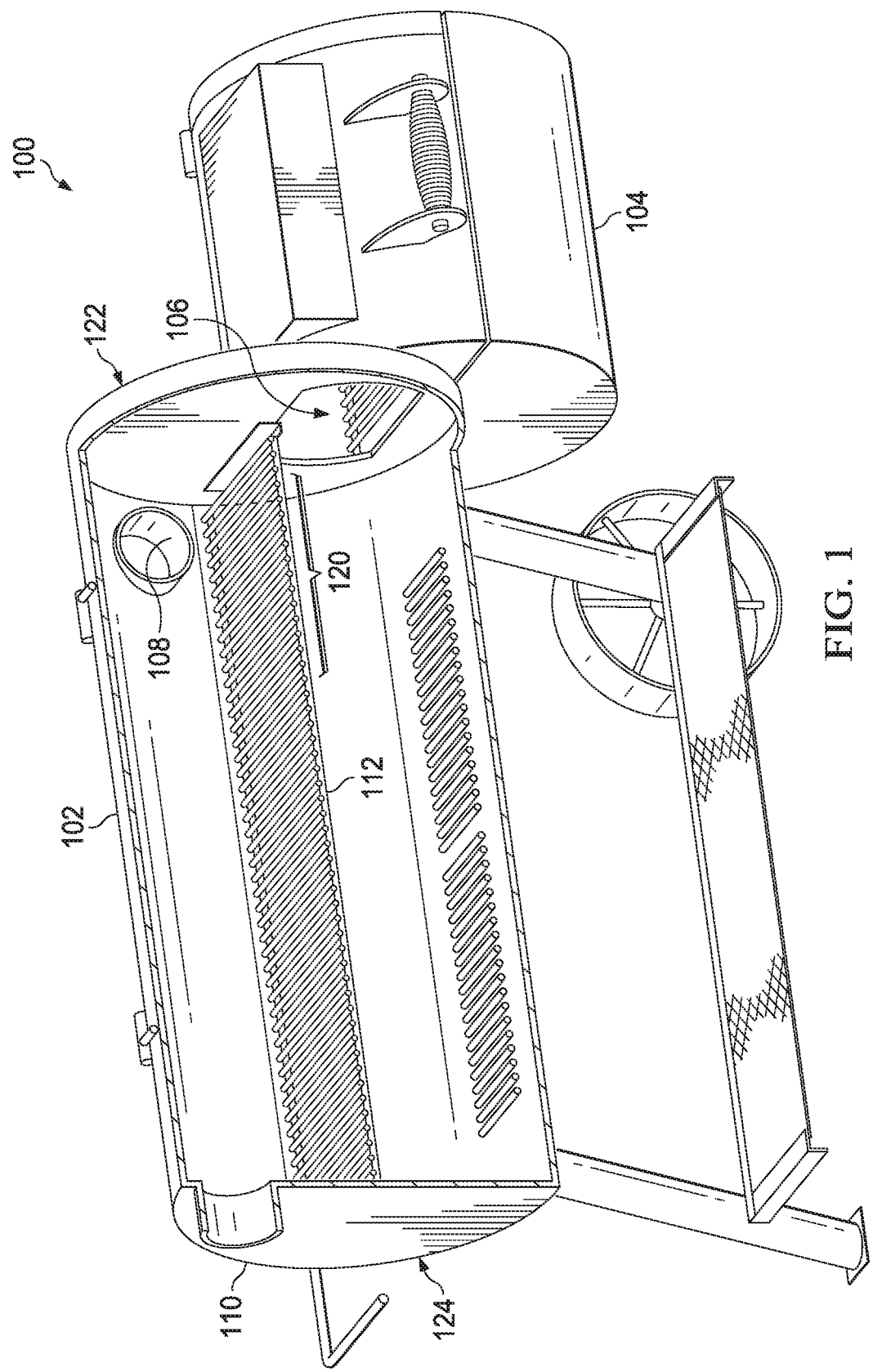
FIG. 1 is a perspective cutaway view of a smoker with a cooking chamber and firebox and no baffles or exhaust means.

Referring now to FIG. 1, a perspective cutaway view of a smoker 100 with a cooking chamber 102 and offset firebox 104 is shown. An opening 106 connects the cooking chamber 102 with the firebox 104 and provides for fluid communication. The opening 106 may be selectively openable to control flow of smoke and exhaust gases into the cooking chamber 102. The term "selective" or "selectively" means that the operation is user controllable, or that the user may reconfigure the selective item or operation.

A first exhaust opening 108 adjacent to the firebox 104 is on a first end 122 of the cooking chamber 102 is illustrated along with a second exhaust opening 110 for cooking chamber 102 opposite the firebox 104 (distal from the firebox 104) on a second end 124 of the cooking chamber 102. The import of the locations of the exhaust openings 108, 110 is explained further below. The exhaust openings 108, 110 provide for fluid communication (e.g., gas flow) from the cooking chamber 102. A cooking grate 112 may be located approximately midway (elevationally) within the cooking chamber 102 and may occupy substantially the full width and depth of the cooking chamber 102. The cooking chamber may be generally cylindrical in shape but other shapes are possible.

The cooking grate 112 will generally be superior to the opening 106 since smoke and hot gases will tend to rise upon entering the cooking chamber 102. Similarly, the exhaust openings 108, 110 will generally be superior to both the opening 106 and the cooking grate 112 to promote proper smoke flow and exhaust function.

A single horizontal baffle plate (not shown) may be installed on or below the cooking grate 112 in the cooking chamber 102 at a location 120 adjacent to the opening 106 into the firebox 104. This has the effect of preventing the hot gas exiting the firebox 104 from rising so rapidly to the upper part of the cooking chamber 102 and blocking or substantially reducing the direct fire radiation to the cooking area 120 adjacent to the firebox 104. However, this reduces the effective total cooking area of the smoker 100. In addition, various lengths of such baffles have different effects in terms of cooking food, such that a widely useful single length is difficult to obtain. This is particularly so if the exhaust is located distally from the firebox (e.g., as with exhaust opening 110).

According to embodiments of the present disclosure, the exhaust 108 may be the primary or only exhaust opening and may be located at the end 122 of the cooking chamber adjacent to the fire box 104 and above the cooking grate 112 (near the area 120). In various embodiments of the present disclosure, a multi-part baffle configuration inside the cooking chamber 102 can be altered according to desired cooking characteristics. This may be accomplished by a multi-part modular horizontal set of baffles under the cooking rack 106. The baffles (200, 300, 400, 500) are shown in various installed configurations in FIGS. 2-5 below, and are shown in detail individually in FIGS. 8-11. The baffles 200, 300, 400, 500 are optionally equipped with fixed or variable gas passages through their surfaces (shown below). These horizontal baffles may also have liquid drainage provisions incorporated (also shown below). The baffles 200, 300, 400, 500 may be formed from sheet metal or another suitably heat resistant material.

Figure 2:
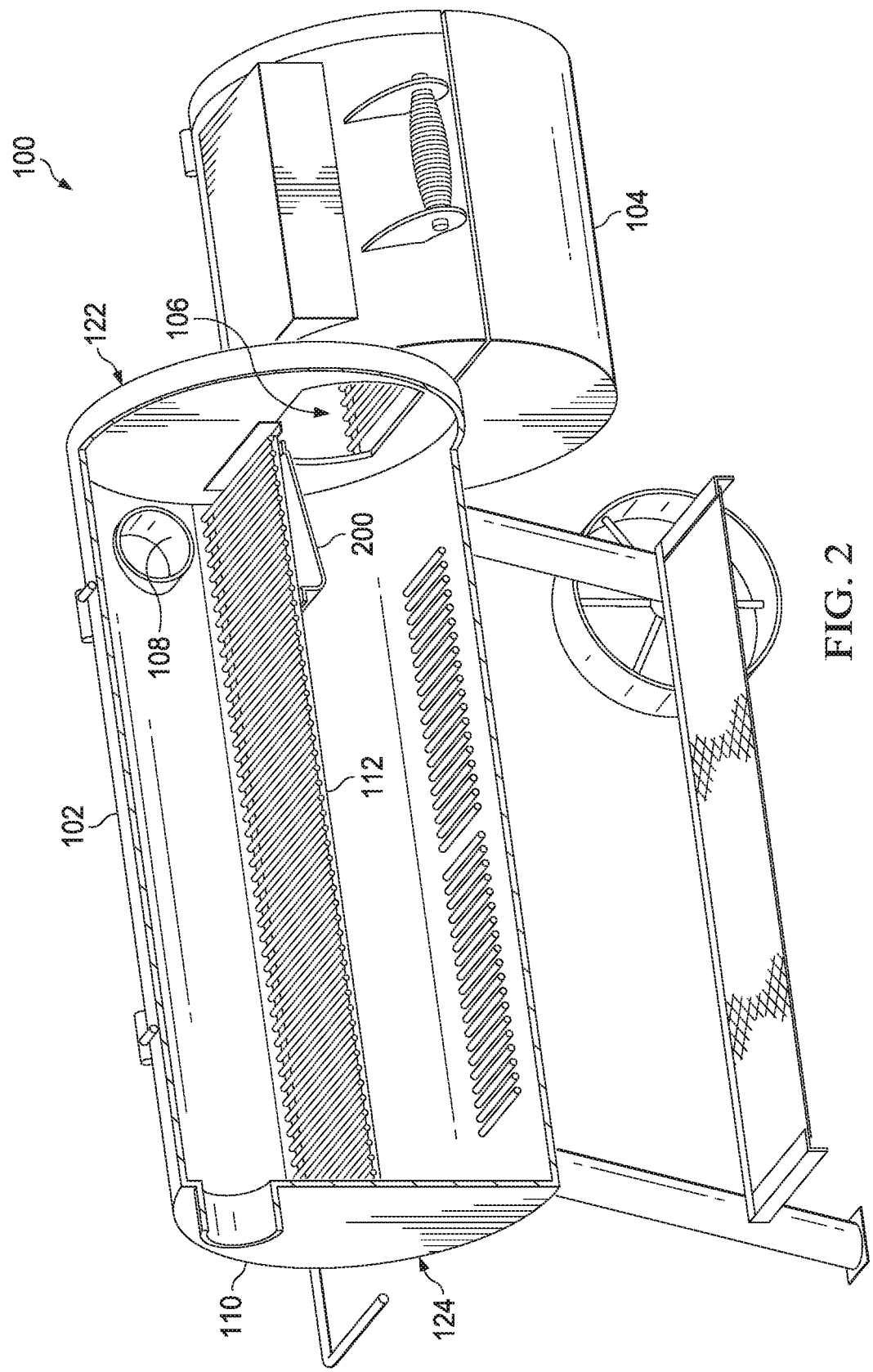
FIG. 2 is a perspective cutaway view of the smoker of FIG. 1 with a single modular baffle in place.

Referring now to FIG. 2 a perspective cutaway view of the smoker 100 of FIG. 1 with a single modular baffle 200 in place is shown. In the present embodiment, the baffle 200 is placed immediately adjacent the firebox 104 directly underneath the grate 112 (e.g., location 120, FIG. 1) but superior to the opening 106. The smoke and heated exhaust gases coming through the opening 106 are not allowed to rise toward either exhaust location 108, 110 until clearing the baffle 200. The baffle 200 may be configured to attach directly to the cooking grate 112 and/or the walls of the cooking chamber 102. In some embodiments, the baffle 200 may be installed or removed without tools. In some embodiments, the baffles 200, 300, 400, 500 affix to the walls of the cooking chamber 102 and/or the grate 112 by tabs, flaps, and/or an interference fit.

Figure 3:
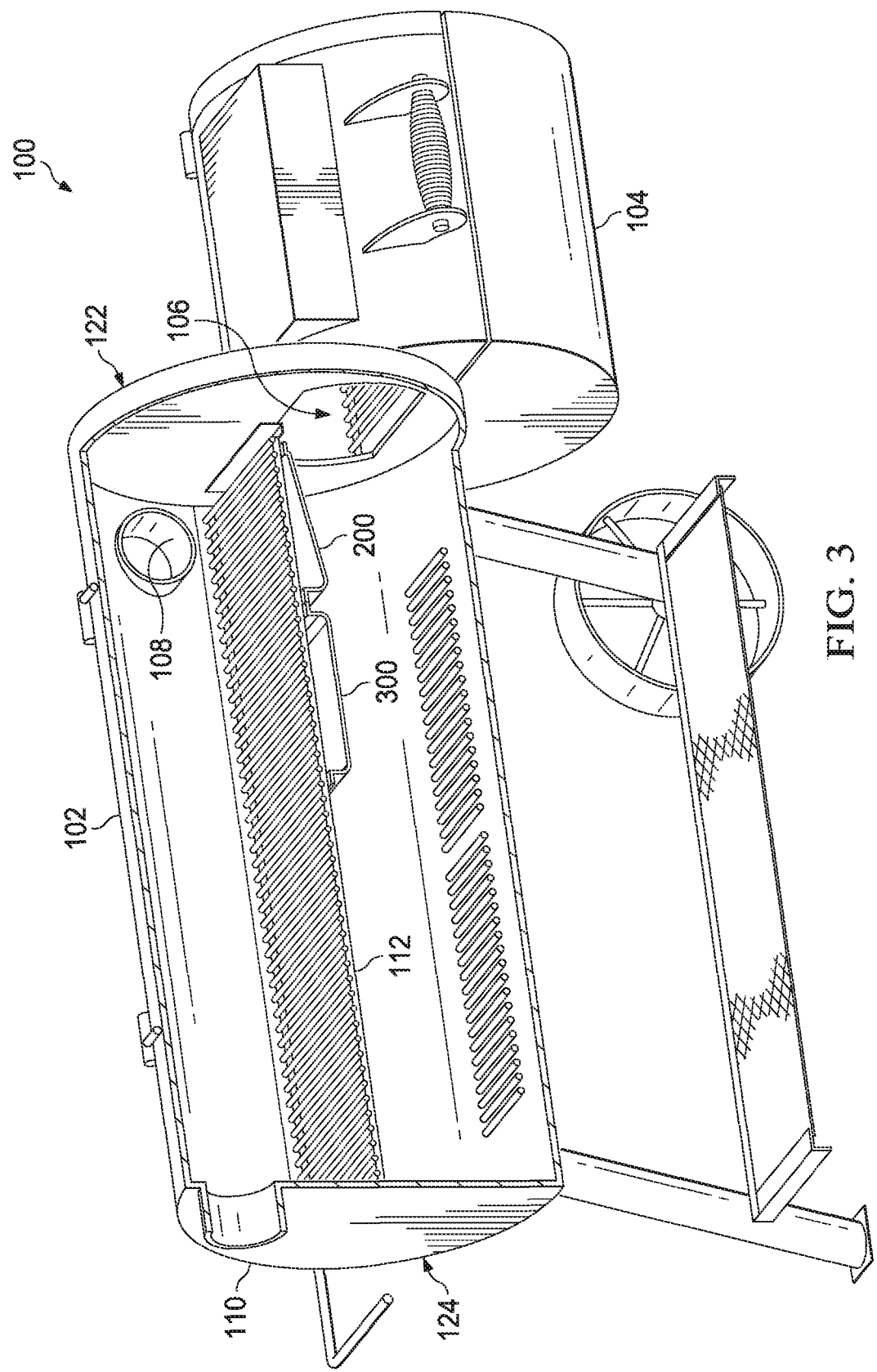
FIG. 3 is a perspective cutaway view of the smoker of FIG. 1 with two modular baffles in place.

Referring now to FIG. 3, a perspective cutaway view of the smoker 100 of FIG. 1 with two modular baffles 200, 300 in place is shown. An additional baffle 300 is placed immediately adjacent to the baffle 200. Here again, the baffle 300 may attach directly to the cooking grate 112 and/or the walls of the cooking chamber 102. The baffle 300 may also be configured to affix to the baffle 200. The effect of baffles 200, 300 is that the smoke and/or heated gases from the opening 106 are moved even further from the opening 106 before being allowed to rise above the plane of the cooking grate 112 and that the locally concentrated direct fire radiation is absorbed and redistributed in a more even radiation from the baffle or baffles.

Figure 4:
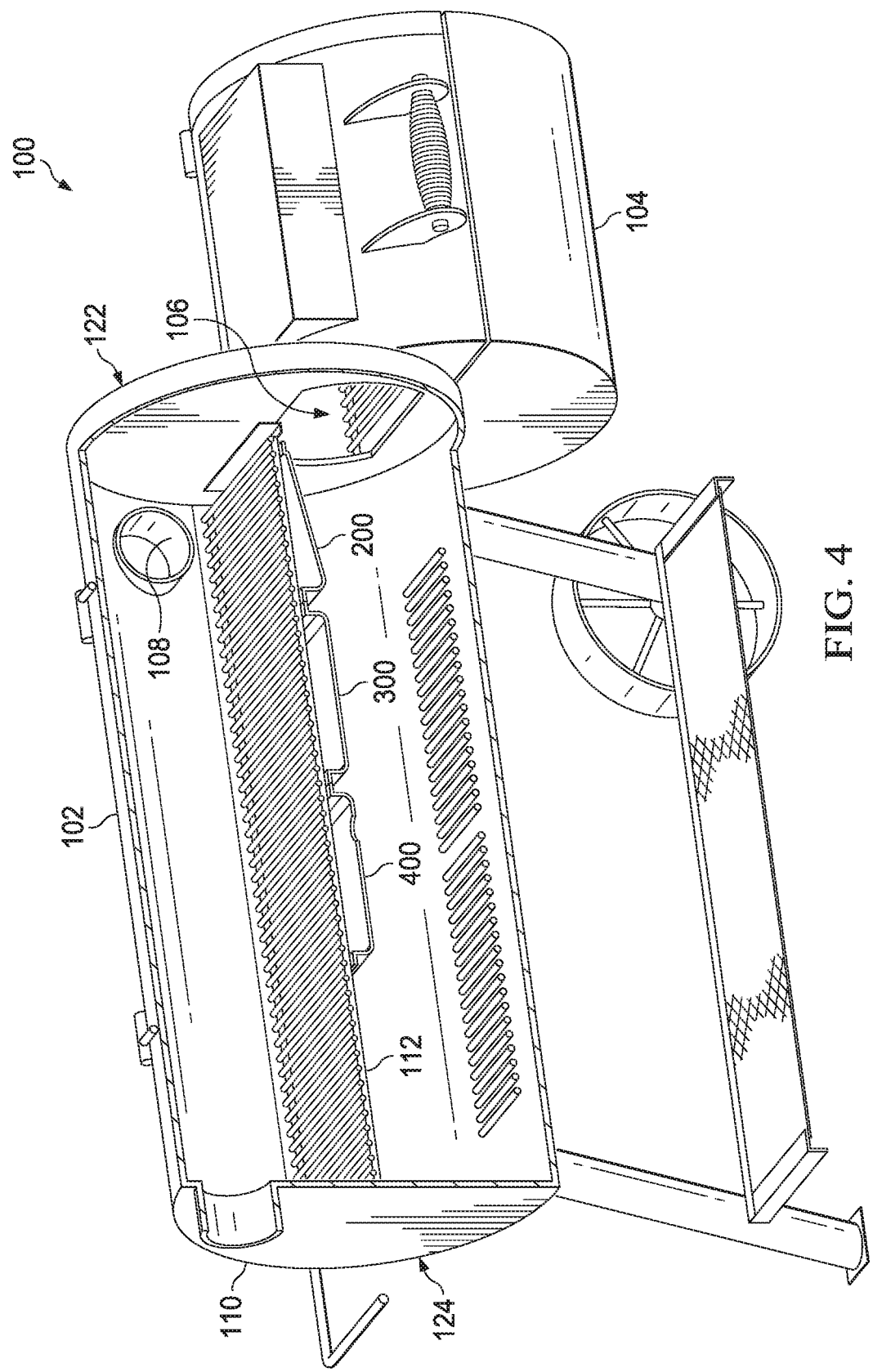
FIG. 4 is a perspective cutaway view of the smoker of FIG. 1 with three modular baffles in place.

Referring now to FIG. 4, a perspective cutaway view of the smoker of FIG. 1 with three modular baffles 200, 300, 400 in place. The baffle 400 adds to the effect of the baffles 200, 300 by extending the path that smoke and gases travelling under the cooking grate 112 must travel before being allowed to rise. The baffle 400 may be similar to those previously described in having the ability to attach to cooking chamber 102 walls, the cooking grate 112, or the adjacent baffle 300.

Figure 5:
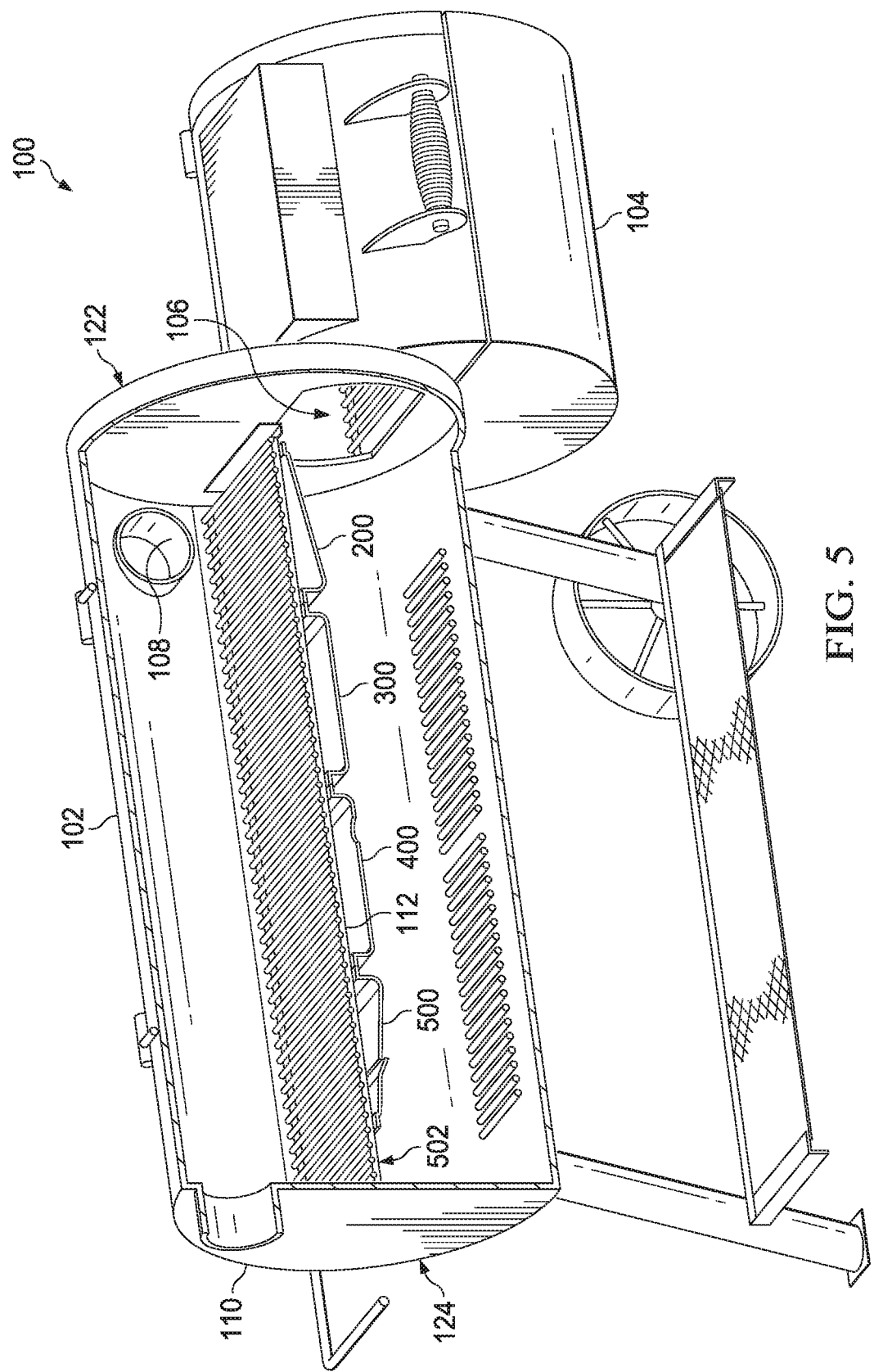
FIG. 5 is a perspective cutaway view of the smoker of FIG. 1 with four modular baffles in place.

Referring now to FIG. 5, a perspective cutaway view of the smoker of FIG. 1 with four modular baffles 200, 300, 400, 500 in place is shown. The baffle 500 adds to the effect of the baffles 200, 300, 400 by extending the path that smoke and gases travelling under the cooking grate 112 must travel before being allowed to rise. The baffle 500 may be similar to those previously described in having the ability to attach to cooking chamber 102 walls, the cooking grate 112, or the adjacent baffle 400.

The baffles 200, 300, 400, 500 may not fit immediately against the cooking grate 112 such that they maintain full and contiguous contact. They may provide some offset or depth from the cooking grate 112, possibly being dished or pan-shaped. It should also be appreciated that the baffles 200, 300, 400, 500 may not be identical. They may differ in depth, slope, and/or drainage and ventilation features. They may also cover different amounts of the width of the cooking grate 112. Other embodiments may also provide more or fewer baffles to work with. Even when all baffles 200, 300, 400, 500 are installed, an area 501 of the cooking grate 112 may remain that is not covered or obstructed by a baffle. In some embodiments, this area 501 is oppositely situated from opening 106 such that gas and smoke travels the maximum distance below the cooking grate 112 before being allowed to rise above its plane. It is also possible, in some embodiments, to install the baffles 200, 300, 400, 500 with some open space therebetween such that some smoke or heat is allowed to rise above the cooking grate 112 before reaching the distal end 124 of the cooking chamber 102.

Figure 6:
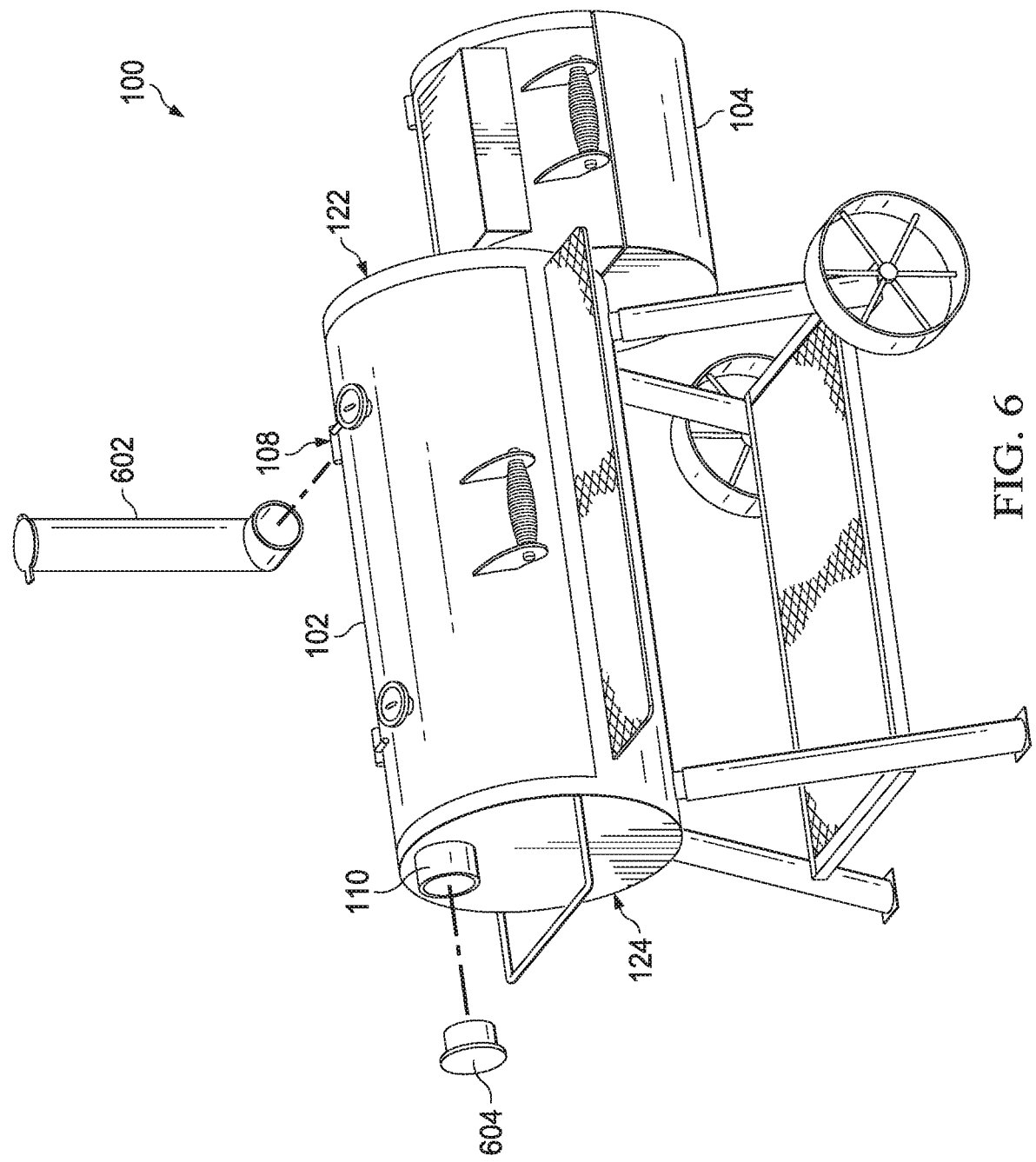
FIG. 6 is a perspective view of a smoker with exhaust means adjacent the firebox, and blocked opposite the firebox, according to aspects of the present disclosure.

Referring now to FIG. 6, a perspective view is shown of the smoker 100 with an exhaust stack 602 in position to affix to exhaust opening 108 adjacent the firebox 104 at end 122 of the cooking chamber 102. The stack 602 may be considered a tube, pipe, chimney, conduit, or flue for directing exhaust gases up and away from a user. The exhaust opening 110 on distal end 124 of cooking chamber 102 is blocked by a stopper 604.

Figure 7:
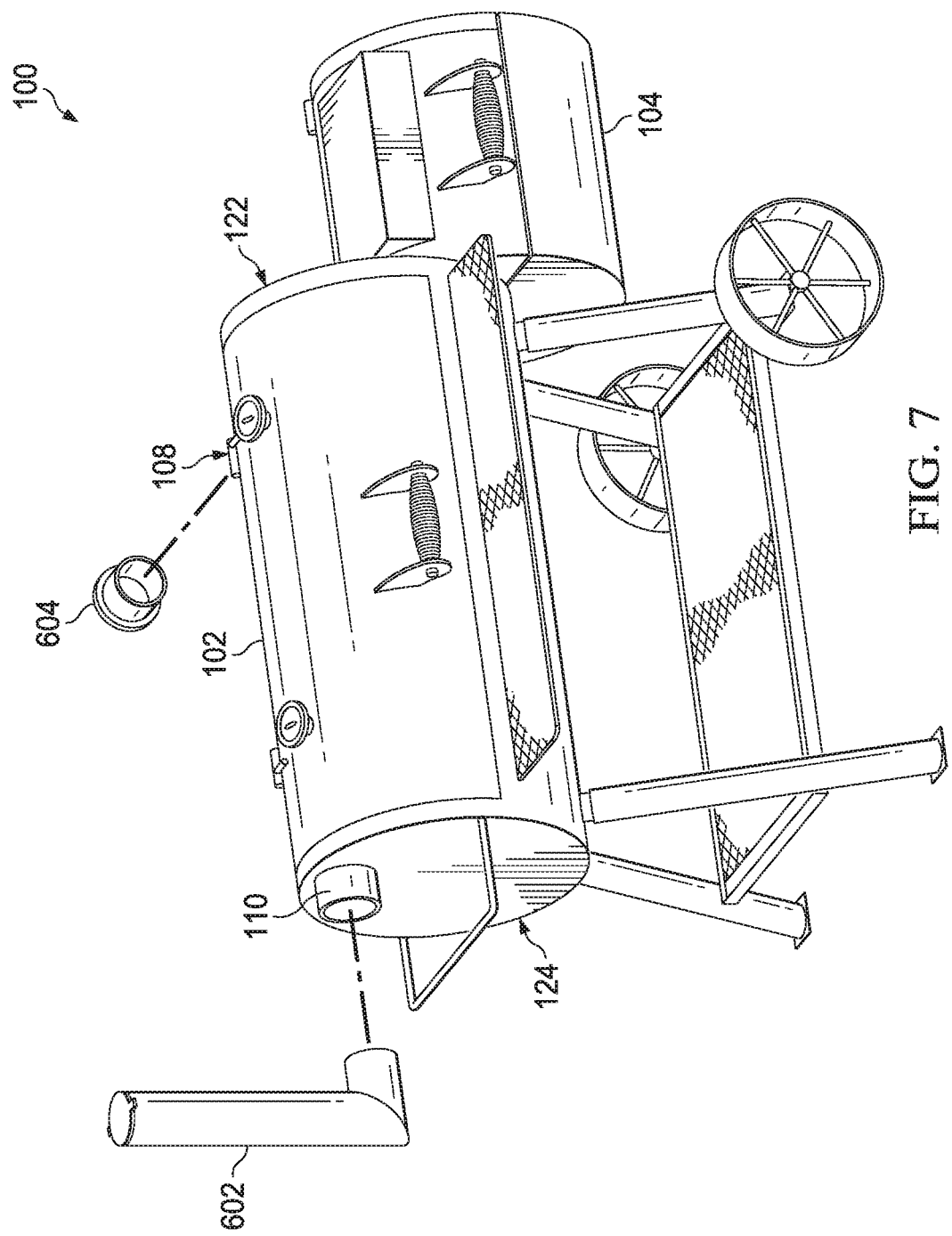
FIG. 7 is a perspective view of the smoker of FIG. 6 with exhaust means opposite the firebox, and blocked adjacent the firebox, according to aspects of the present disclosure.

Referring now to FIG. 7, a perspective view of the smoker 100 exhaust stack 602 opposite the firebox 104 is shown. The stack 602 affixes to exhaust opening 110 while exhaust opening 108 is provided with stopper 604.

FIGS. 6 and 7 illustrate differing configurations for directing internal exhaust or smoke flow from the firebox 104. The external configuration of FIG. 6 used with the internal configuration of FIG. 5, for example, will provide for maximum smoke and exhaust travel through the cooking chamber 102. The external configuration of FIG. 7 with the internal configuration of FIG. 1 (e.g. no baffles) provides a less circuitous path for smoke travelling through the cooking chamber 102. It should be understood that the configurations may be mixed and matched (for example, one or more baffles 200, 300, 400, 500 may be used with the external configuration of FIG. 7).

Figure 8:
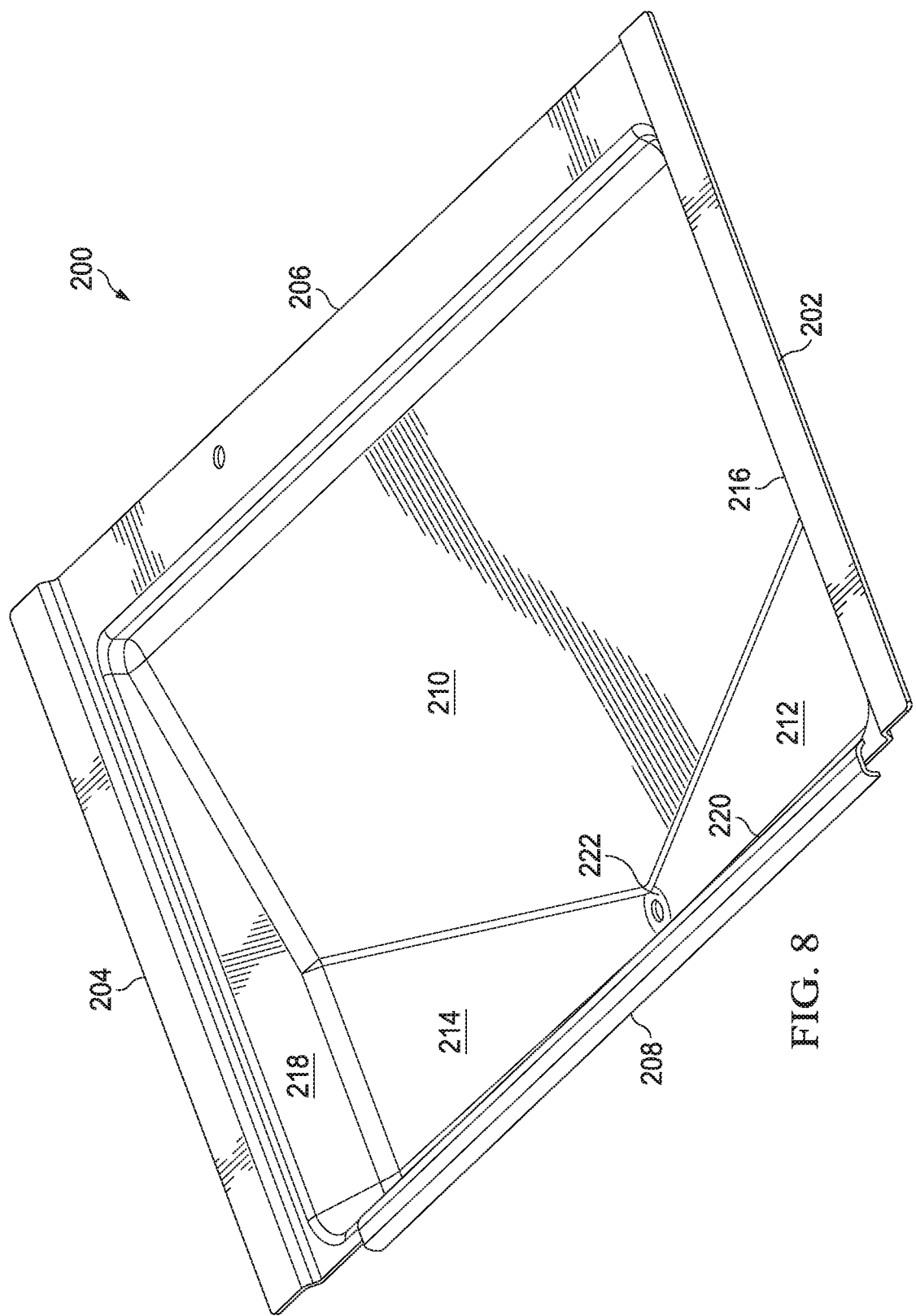
FIG. 8 is a perspective view of a first baffle for use in a variable configuration smoker according to aspects of the present disclosure.

Referring now to FIG. 8, a more detailed perspective view of the first baffle 200 for use in a variable configuration smoker 100 according to aspects of the present disclosure is shown. The baffle 200 may have a generally rectangular or square outline when viewed from above. The baffle 200 may comprise a frontward portion 202, a rearward portion 204, a rightward portion 206 and a leftward portion 208. Rightward portion 206 may be oriented toward the opening 106 when installed. Leftward portion 208 may be opposite and may be curved as to hook on to and hang from a portion of the cooking grate 112. Frontward portion 202 and rearward portion 204 may join to the cooking grate 112 and/or the walls of the cooking chamber 102.

The baffle 200 may be generally dished and comprise one or more planar or curved portions 210, 212, 214 that slope downwardly away from the rightward portion 206, frontward portion 202, and rearward portion 204, respectively. Planar portion 212 may be suspended in part from front wall 216 and leftward wall 220. Planar portion 214 may be suspended in part from leftward wall 220 and rear wall 218. Opposite from the leftward wall 210 the planar portions 212, 214 join with planar portion 210. The effect here is that the planar portions slope toward draining opening 222, located at the lower point among the three planar portions 210, 212, 214. The drainage opening may be oriented more leftward than rightward so keeping the drainage of fats and grease away from the opening 106 below the rightward portion 206.

Figure 9:
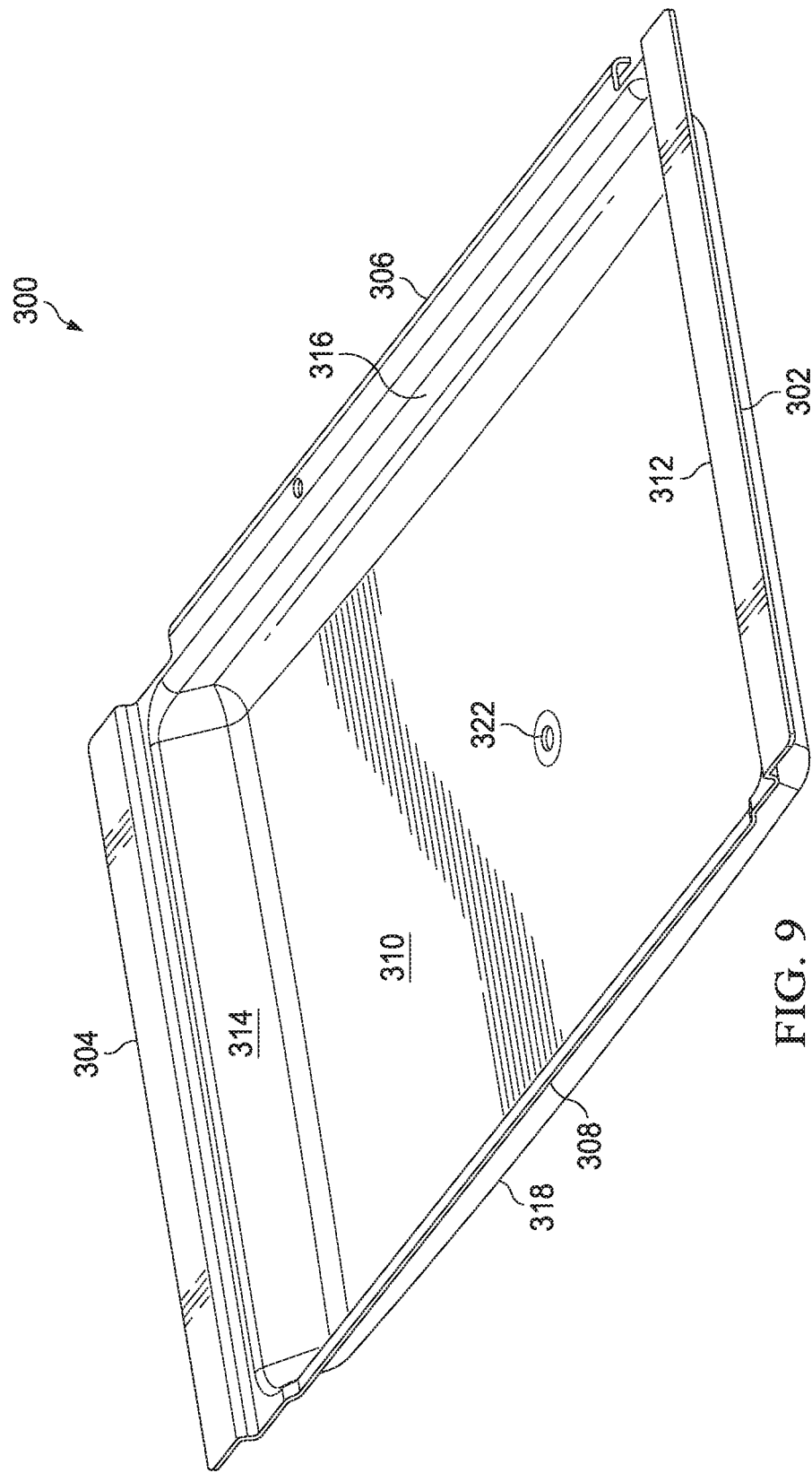
FIG. 9 is a perspective view of a second baffle for use in a variable configuration smoker according to aspects of the present disclosure.

Referring now to FIG. 9, a more detailed perspective view of the second baffle 300 for use in the variable configuration smoker 100 according to aspects of the present disclosure is shown. The baffle 300 may have a generally rectangular or square outline when viewed from above. The baffle 300 may comprise frontward portion 302, rearward portion 304, rightward portion 306, and leftward portion 308. The rightward portion 306 may be closest to the baffle 200 (or opening 106 below). The rightward portion 306 and/or leftward portion 308 may be configured to hook on to and/or suspend from the cooking grate 112. The rightward portion 306 and/or leftward portion 308 may also join to adjacent baffles. Frontward portion 302 and/or rearward portion 304 may join to the cooking grate 112 and/or the walls of the cooking chamber 102.

The baffle 300 may be dished or pan shaped. In the present embodiment, a floor 310 is suspended below the cooking grate 112 (when installed) by frontward wall 312, rearward wall 314, rightward wall 316, and leftward wall 318. The floor 310 may be generally planar, or it may have a slight central downward slope leading to a drainage opening 322.

Figure 10:
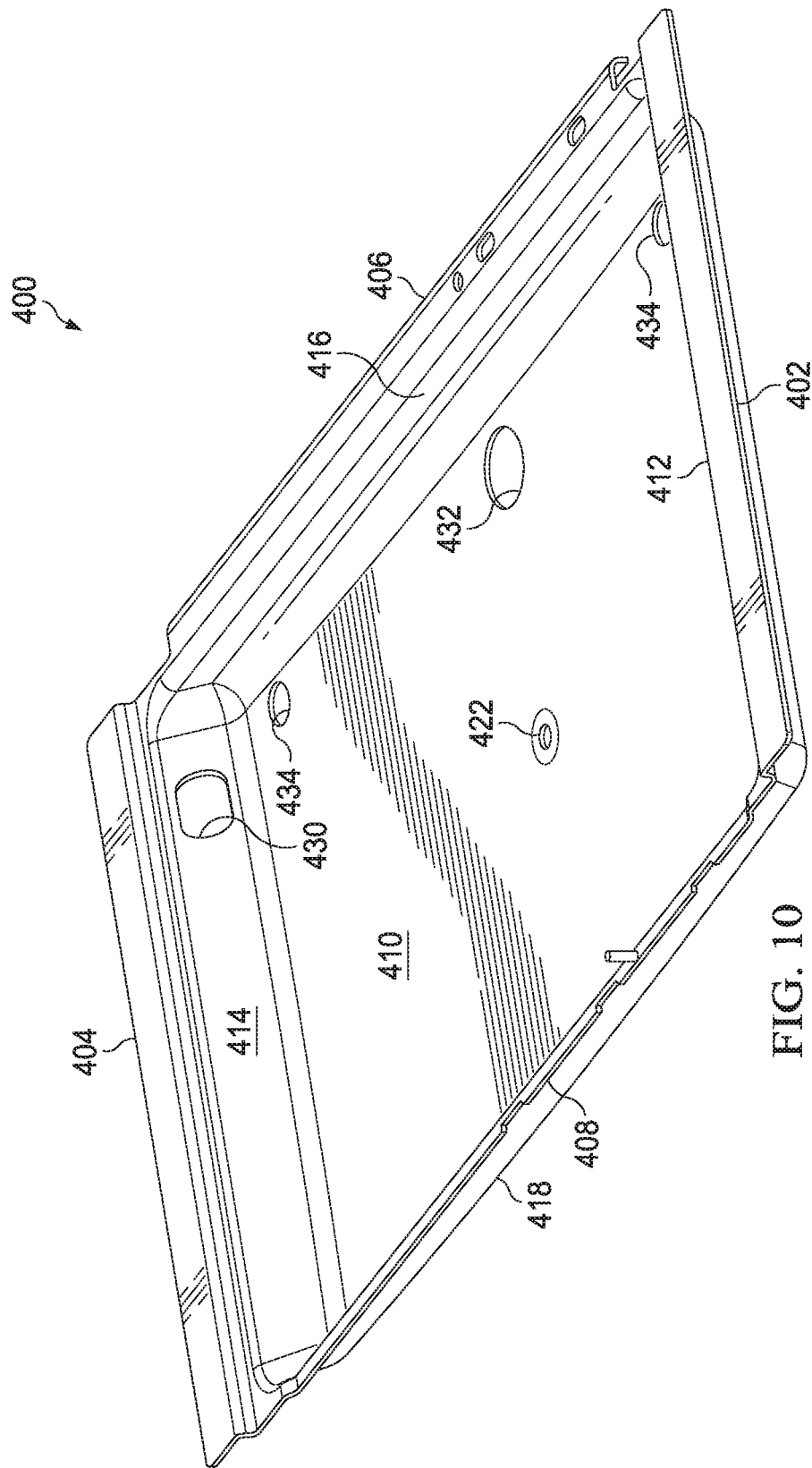
FIG. 10 is a perspective view of a third baffle for use in a variable configuration smoker according to aspects of the present disclosure.

Referring now to FIG. 10, a more detailed perspective view of the third baffle 400 for use in the variable configuration smoker 100 according to aspects of the present disclosure is shown. The baffle 400 may have a generally rectangular or square outline when viewed from above. The baffle 400 may comprise frontward portion 402, rearward portion 404, rightward portion 406, and leftward portion 408. The rightward portion 406 may be closest to the adjacent baffle 300 and may be configured to hook onto and/or hang from the cooking grate 112. It may also affix to the adjacent baffle 300. Similarly, the leftward portion 408 may attach to the cooking grate 112 and/or the fourth baffle 500. Frontward portion 402 and/or rearward portion 404 may join to the cooking grate and/or the walls of the cooking chamber 102.

The baffle 400 may be dished or pan shaped having a floor 410 sloped to direct any liquids falling thereon down to opening 410. The floor may be suspended or spaced apart from the cooking grate 112 by one or more of a frontward wall 412, a rearward wall 414, a rightward wall 416, and a leftward wall 418.

As can be seen from FIG. 1, the baffle 400 is third in a series of four (in the present embodiment and configuration) and as such may (at least partially) be nearer the opposite end of the cooking chamber 102 from the opening 106 than the opening 106 itself. Gases may have by this point started to cool such that it would be advantageous to allow some (but not all) gases and smoke from the opening 106 to pass through to the cooking grate. To this end, the baffle 400 is provided with an opening 430 in the rearward wall 404. The opening 430 may be proximate the rightward portion 406 (e.g., closer to the opening 106). A corresponding hole (concealed behind frontward portion 402) may also be present in the frontward wall 412.

A large opening 432 may be located in the floor 432 centrally located proximate the rightward portion (e.g., closer to the opening 106). Also shown are smaller adjacent openings 434 located spaced away from the large opening 432 but remaining proximate the rightward portion 406. It will be appreciated that the location, size and number of openings or hole may vary depending upon the application and the desired characteristics of the smoker 100.

Figure 11:
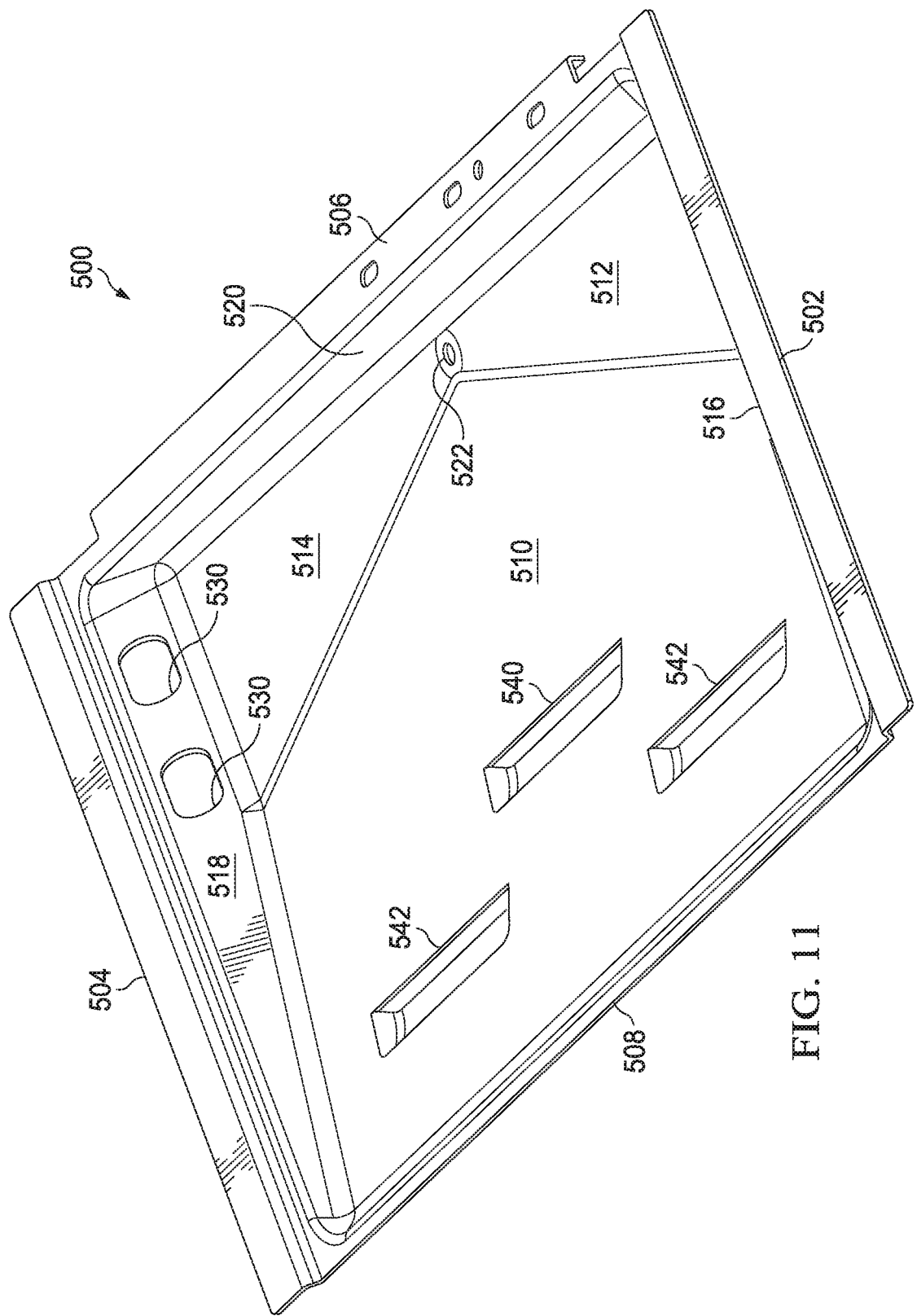
FIG. 11 is a perspective view of a fourth baffle for use in a variable configuration smoker according to aspects of the present disclosure.

Referring now to FIG. 11, a more detailed perspective view of the fourth baffle 500 for use in the variable configuration smoker 100 according to aspects of the present disclosure is shown. The baffle 500 may have a generally rectangular or square outline when viewed from above. The baffle 500 may comprise a forward portion 502, a rearward portion 504, a rightward portion 506, and a leftward portion 508. Rightward portion 506 may be oriented toward the opening 106 when installed. The rightward portion 506 or the leftward portion 508 may be curved or otherwise configured to hook into or hang from the cooking grate 112. The rightward portion 506 may also be configured to attach to the adjacent baffle 400. The frontward portion 502 and the rearward portion 504 may join to the cooking grate 112 and/or the walls of the cooking chamber 102. The frontward portion 502 and the rearward portion 504 may join to the cooking grate 112 and/or the walls of the cooking chamber 102.

The baffle 500 may be generally dished and comprise one or more planar portions 510, 512, 514 situated at varying depths below the cooking grate 112. The baffle 500 may be mirrored to the configuration of the oppositely located baffle 200. The planar portion 510 may slope downwardly away from leftward portion 508 while the planar portion 512 and the planar portion 514 slope downwardly from the frontward portion 502 and the rearward portion 504, respectively. Planar portion 510 may be suspended in part from frontward wall 516, which is suspended from frontward portion 502, and from rearward wall 518, which is suspended from rearward portion 504. Planar portion 512 may be suspended partially from frontward wall 516 and partially from a rightward wall 520, which is suspended from the rightward portion 506. The planar portion 514 may be suspended partially by the rightward wall 520 and partially by the rearward wall 518. The planar portions are joined together and direct liquids (e.g., fats and grease) falling thereon into opening 522. The opening 522 may be situated proximate rightward wall 520 at the lowest point of the baffle 500.

The baffle 500 is installed furthest from the opening 106 of all the baffles in the embodiment illustrated in FIG. 5. Accordingly, gases and smoke reaching this location have cooled more than at any other baffle location. Beyond the baffle 500 (e.g., at open area 501) gases and smoke are allowed to rise freely above the cooking grate 112 even if all baffles (200, 300, 400, 500) are installed. As described with respect to FIG. 10 and baffle 400, it may be advantageous to allow at least a partial throughflow of gases or smoke before they pass completely beyond the baffle 500 (e.g., into open area 501). Accordingly, a pair of openings 530 may be defined in rearward wall 518. These may be somewhat spaced apart but both proximate the rightward wall 520. A matching pair of openings (hidden by frontward portion 502 in FIG. 11) may be defined in the frontward wall 516.

In addition to openings in the walls 516, 518 the baffle 500 may admit smoke and gasses to the cooking grate 112 by the use of louvres 540, 542 defined in the planar surface 510. These may open toward the opening 106 on the right side of cooking grate 112 to take advantage of the direction of flow of gases and smoke below the baffles 200, 300, 400, 500 from right to left. A central louvre 540 is located lower down on the planar portion 510 than two flanking louvres 542 that are spaced apart laterally from the central louvre 540 and located more upward on the planar surface 510 than the central louvre 540 (although these are "downstream" in the smoke and gas flow from the central louvre 540). It will be appreciated that all the openings, louvers, slots and vents shown in all the baffle embodiments, 200, 300, 400, and 500, can be made with a closable means as known to the art to allow adjustment of gas flow through the baffles.

Referring back now to FIGS. 6-7, it was seen that the exhaust location can be varied (e.g. between exhaust opening 108 and exhaust opening 110). An exhaust control may be installed at both locations 108, 110 to manipulate flow further. The exhaust control at either or both locations 108, 110 may comprise a butterfly valve or other closeable device allowing exhaust and flow manipulation without physically relocating the exhaust stack 602 and the plug 604. In such cases, a stack (such as stack 602) can be provide at either, or both, exhaust openings 108, 110.

It will be clear from the discussion of the current situation and its limitations that the routing of the hot gases from the firebox 104 through the cooking chamber 102 can be a complex matter in which no single solution may offer the wide range of possible techniques and outcomes provided by the present embodiments. By having the ability to configure operations in a variety of ways the consumer can assemble the product 100 to cook in whatever way they choose. This would include including the original configurations described, as well as various modifications described, and others not specifically described but readily conceivable based on the present disclosure and components described herein. For example, one or several of the baffles 200, 300, 400, 500 may be placed below the cooking grate 112 with the exhaust 602 either at the end 124 opposite the firebox 104 or at the end 122 adjacent to the firebox 104. This will allow the most advantageous matching of hot gas flow to the size and amount of food being cooked. Gas passages defined in the baffles 200, 300, 400, 500 may also be fixed or variable (e.g., with sliding closures, flaps, valves or other selectively opening devices). Such fixed or selectable gas passages can be used to further determine the amount of direct hot gas flow vertically through the cooking grate 112 to the underside of the food being cooked. In fact, the combination of variable length baffling and variable exhaust location provides the consumer with a heretofore unobtainable way to produce precisely the type of cooking results required.

Figure 12:
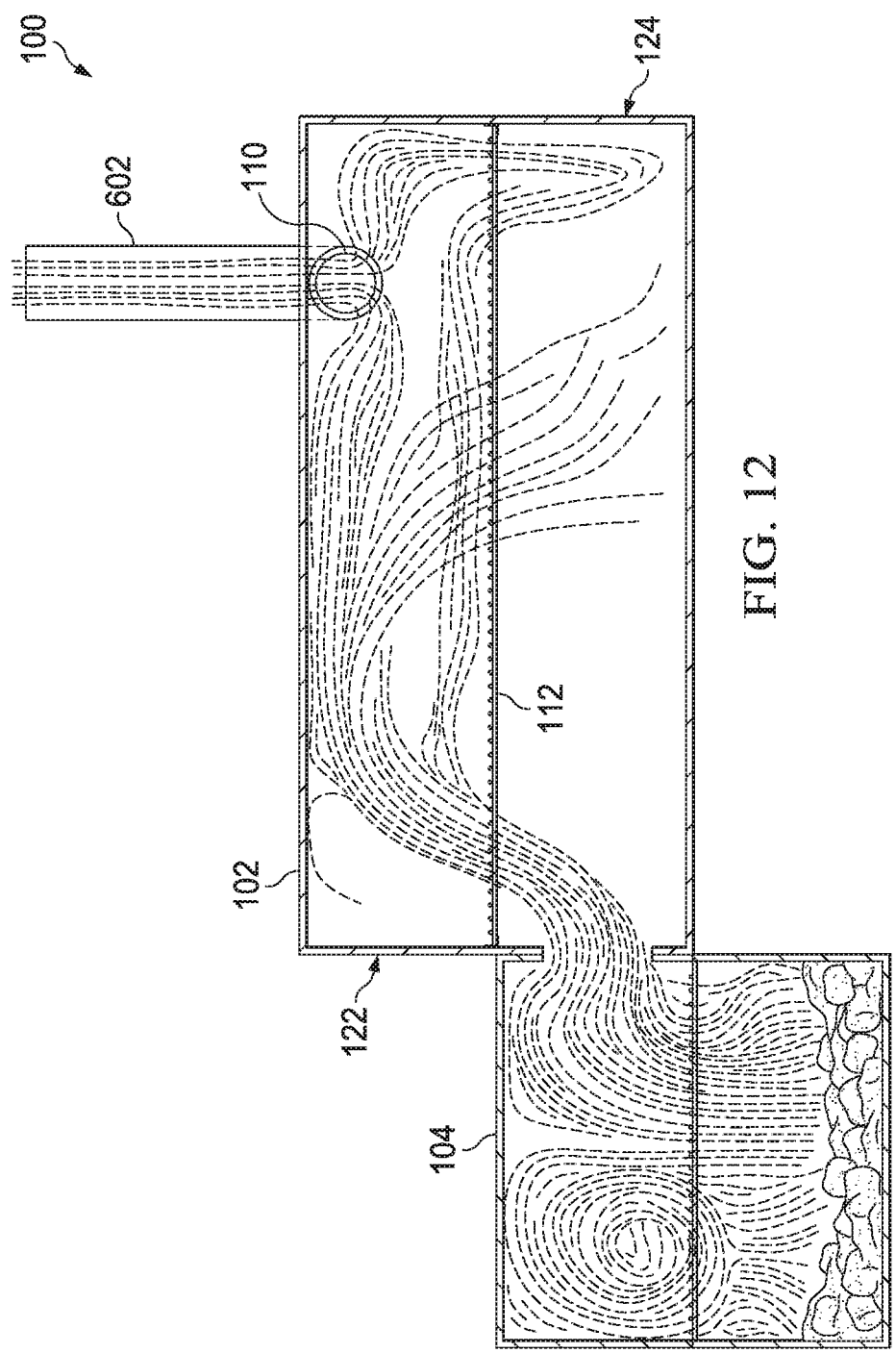
FIG. 12 is a computational fluid dynamics simulation trace of a current smoker.
Figure 13:
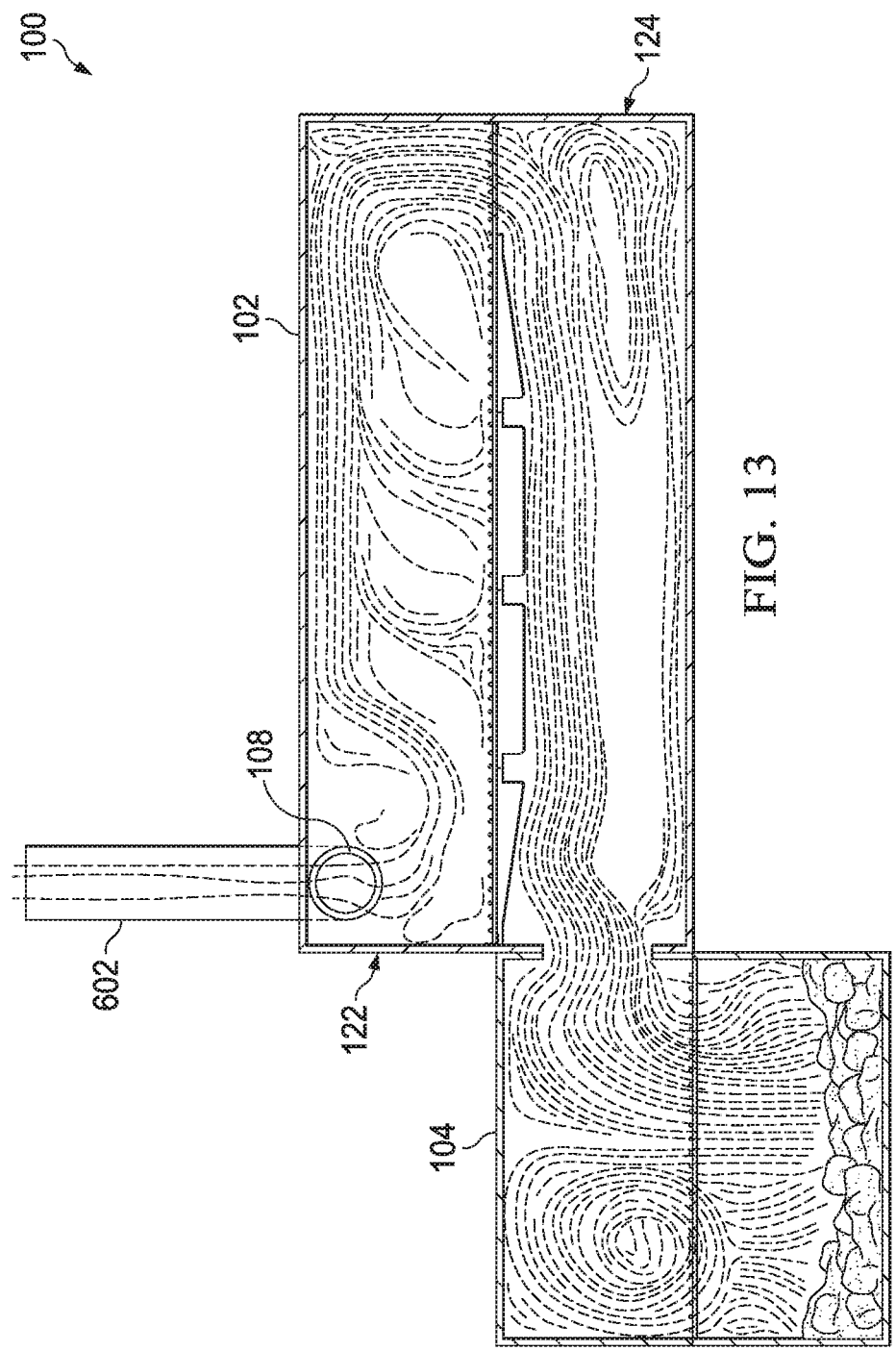
FIG. 13 is a computational fluid dynamics simulation trace of a variable configuration smoker according to aspects of the present disclosure.

The effect of rearrangement and reconfiguration of the smoker 100 according to various embodiments of the present disclosure can be experienced in cooking and shown in Computational Fluid Dynamics (CFD) simulation. FIG. 12 illustrates a configuration where no baffles are deployed on the cooking grate 112 and the exhaust opening 110 is operational. FIG. 13, on the other hand, is a computational fluid dynamics simulation trace with the baffles 200, 300, 400, 500 installed as shown in FIG. 5 (in FIG. 13 the baffles 200, 300, 400, 500 are obscured by the smoke/trace). It can be observed how the smoke must travel to the far end 124 of the cooking chamber 102 before being allowed to rise above the cooking grate 112 (obscured) and traverse back to the proximal end 122 of the cooking chamber 122 where it is allowed to escape via exhaust opening 108 into stack 602.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
    a smoker having a cooking chamber and a firebox in fluid communication with the cooking chamber;
    a cooking grate within the cooking chamber;
    a first exhaust opening in the cooking chamber proximate the firebox, above the cooking grate;
    a second exhaust opening in the cooking chamber distal from the firebox, above the cooking grate; and
    a plurality of generally horizontal baffles below the cooking grate, at least one of which is situated near the firebox to direct smoke from the firebox away from the firebox before it rises above a level of the cooking grate;
    wherein the at least one generally horizontal baffle is affixed to at least another of the plurality of generally horizontal baffles such that smoke is prevented from passing therebetween;
    wherein the plurality of generally horizontal baffles comprises baffles that are individually selectively removable from the cooking chamber to alter a distance of travel of the smoke away from the firebox toward the second exhaust opening below the cooking grate before the smoke is allowed to rise above the cooking grate;
    wherein the plurality of generally horizontal baffles affix to the cooking grate from below the cooking grate; and
    wherein the first and second exhaust openings may be selectively enabled to direct exhaust smoke through the cooking chamber in combination with the plurality of generally horizontal baffles.

2. The system of claim 1, wherein at least one of the plurality of generally horizontal baffles defines a drainage opening.

3. The system of claim 1, wherein at least one of the plurality of generally horizontal baffles defines a plurality of louvres.

4. The system of claim 3, wherein the at least one of the plurality generally horizontal baffles defining the plurality of louvres defines the plurality of louvres angled toward a side of the baffle to draw flowing smoke therethrough.

5. The system of claim 1, wherein each of the plurality of baffles is square in outline from above.

6. The system of claim 5, wherein at least one of the plurality of baffle is dished with a sloped floor leading downward to a drainage opening oriented to a side of the baffle.

7. The system of claim 1, wherein at least one of the plurality of baffles comprises a frontward portion, a rearward portion, a rightward portion, and a leftward portion.

8. The system of claim 7, wherein the at least one of the baffles further comprises a planar surface suspended below the cooking grate by at least one wall suspended from any of the frontward portion, rearward portion, rightward portion, and leftward portion.

9. The system of claim 1, wherein at least one of the plurality of generally horizontal baffles is affixed to the cooking grate adjacent thereto so as to prevent smoke from passing from below the at least one of the plurality of generally horizontal baffles upward through the cooking grate.

10. A system comprising:
a cylindrical cooking chamber having a cooking grate therein;
a firebox in fluid communication with the cooking chamber on a first end thereof;
a first exhaust opening defined proximate the first end of the cooking chamber proximate and higher than at least part of the firebox;
a second exhaust opening in the cooking chamber on a second end thereof, distal from and higher than at least part of the firebox;
a first exhaust control on the first exhaust opening and a second exhaust control on the second exhaust opening that individually and separately open and close the first and second exhaust openings, respectively; and
a plurality of selectively installable baffles;
wherein the plurality of selectively installable baffles have a first configuration wherein each of the plurality of selectively installable baffles are fixed inside the cooking chamber below the cooking grate to extend a path of smoke from the firebox, around the fixed plurality of selectively installable baffles, and back toward the first exhaust opening with the second exhaust opening closed;
wherein, when the plurality of baffles are fixed inside the cooking chamber below the cooking grate in the first configuration, each of the plurality of baffles is immediately adjacent to at least one other of the plurality of baffles such that smoke is blocked from flowing between adjacent baffles;
wherein the plurality of selectively installable baffles have a second configuration wherein a first subset of the plurality of selectively installable baffles are removed from inside the cooking chamber below the cooking grate and a second subset of the plurality of selectively installable baffles are fixed inside the cooking chamber below the cooking grate;
wherein, when the first subset of the selectively installable baffles are removed from inside the cooking chamber below the cooking grate in the second configuration none of the selectively installable baffles of the second subset blocks smoke flow in the cooking chamber; and
wherein the second exhaust opening may be opened to allow smoke to escape from the cooking chamber after passing the plurality of selectively installable baffles in the first configuration.

11. The system of claim 10, wherein at least one of the plurality of baffles comprises a dish shape where a portion of the baffle is spaced apart from the cooking grate.

12. The system of claim 10, wherein at least one of the plurality of baffles slopes toward a drainage opening oriented distally from the firebox.

13. The system of claim 10, wherein at least one of the plurality of baffles provides a plurality of louvres oriented to draw smoke from the firebox toward the cooking grate.

14. The system of claim 10, wherein when the plurality of selectively installable baffles is in the first configuration, at least one of the plurality of selectively installable baffles in fixed adjacent the cooking grate to block smoke from flowing from below the at least one of the plurality of selectively installable baffles through the cooking grate.

15. The system of claim 10, wherein when the plurality of selectively installable baffles is in the second configuration, at least one of the plurality of selectively installable baffles in fixed adjacent the cooking grate to block smoke from flowing from below the at least one of the plurality of selectively installable baffles through the cooking grate.

* * * * *